United States Patent
Lynch et al.

(10) Patent No.: US 11,242,711 B2
(45) Date of Patent: Feb. 8, 2022

(54) FABRIC HAVING A BACKING MATERIAL FOR A COVERING FOR AN ARCHITECTURAL OPENING

(71) Applicant: Hunter Douglas, Inc., Pearl River, NY (US)

(72) Inventors: David Lynch, Centennial, CO (US); Erick A. Phillips, Denver, CO (US); Paul G. Swiszcz, Niwot, CO (US); Stephen T. Wisecup, Niwot, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 320 days.

(21) Appl. No.: 15/738,887

(22) PCT Filed: Jun. 24, 2016

(86) PCT No.: PCT/US2016/039335
§ 371 (c)(1),
(2) Date: Dec. 21, 2017

(87) PCT Pub. No.: WO2016/210312
PCT Pub. Date: Dec. 29, 2016

(65) Prior Publication Data
US 2018/0216402 A1 Aug. 2, 2018

Related U.S. Application Data

(60) Provisional application No. 62/185,326, filed on Jun. 26, 2015.

(51) Int. Cl.
*E06B 9/262* (2006.01)
*E06B 9/386* (2006.01)
(Continued)

(52) U.S. Cl.
CPC .............. *E06B 9/262* (2013.01); *B32B 5/024* (2013.01); *B32B 5/04* (2013.01); *B32B 5/12* (2013.01);
(Continued)

(58) Field of Classification Search
CPC .. E06B 9/386; B32B 7/03; B32B 5/04; B32B 7/022; B32B 5/12; B32B 27/12;
(Continued)

(56) References Cited

U.S. PATENT DOCUMENTS

| 3,104,998 A | 9/1963 | Gelpke |
| 3,137,893 A | 6/1964 | Gelpke |

(Continued)

FOREIGN PATENT DOCUMENTS

WO    WO 97/30841    8/1997

OTHER PUBLICATIONS

PCT International Search Report dated Sep. 16, 2016 (4 pages).

*Primary Examiner* — Elizabeth C Imani
(74) *Attorney, Agent, or Firm* — Dority & Manning, P.A.

(57) ABSTRACT

An architectural covering with an operable vane having a fabric backing is provided. The vane may include a vane fabric and a backing material connected to the vane fabric by a layer of adhesive. The backing material may increase a machine-direction stiffness of the vane while slightly affecting a cross-direction stiffness of the vane. As such, the vane may have increased stiffness in its machine direction while simultaneously remaining flexible in its cross direction.

27 Claims, 5 Drawing Sheets

(51) Int. Cl.

| | | |
|---|---|---|
| *B32B 27/12* | (2006.01) | |
| *B32B 7/12* | (2006.01) | |
| *B32B 5/02* | (2006.01) | |
| *E06B 9/266* | (2006.01) | |
| *E06B 9/42* | (2006.01) | |
| *E06B 9/24* | (2006.01) | |
| *E06B 9/264* | (2006.01) | |
| *B32B 7/03* | (2019.01) | |
| *B32B 5/04* | (2006.01) | |
| *E06B 9/34* | (2006.01) | |
| *B32B 7/022* | (2019.01) | |
| *B32B 5/12* | (2006.01) | |
| *B32B 27/36* | (2006.01) | |
| *B32B 5/26* | (2006.01) | |
| *B32B 5/08* | (2006.01) | |
| *B32B 27/30* | (2006.01) | |
| *E06B 9/15* | (2006.01) | |
| *B32B 5/24* | (2006.01) | |

(52) U.S. Cl.
CPC ............... *B32B 7/022* (2019.01); *B32B 7/03* (2019.01); *B32B 7/12* (2013.01); *B32B 27/12* (2013.01); *B32B 27/36* (2013.01); *E06B 9/24* (2013.01); *E06B 9/264* (2013.01); *E06B 9/266* (2013.01); *E06B 9/34* (2013.01); *E06B 9/386* (2013.01); *E06B 9/42* (2013.01); *B32B 5/02* (2013.01); *B32B 5/08* (2013.01); *B32B 5/24* (2013.01); *B32B 5/26* (2013.01); *B32B 27/304* (2013.01); *B32B 2250/03* (2013.01); *B32B 2262/0246* (2013.01); *B32B 2262/0253* (2013.01); *B32B 2262/0276* (2013.01); *B32B 2262/04* (2013.01); *B32B 2262/062* (2013.01); *B32B 2262/14* (2013.01); *B32B 2305/188* (2013.01); *B32B 2305/20* (2013.01); *B32B 2307/414* (2013.01); *B32B 2307/54* (2013.01); *B32B 2307/546* (2013.01); *B32B 2307/718* (2013.01); *B32B 2367/00* (2013.01); *B32B 2398/20* (2013.01); *B32B 2419/00* (2013.01); *E06B 2009/1516* (2013.01); *E06B 2009/2405* (2013.01)

(58) Field of Classification Search
CPC ....... B32B 5/24; B32B 2305/20; B32B 5/142; B32B 5/022; Y10T 442/662; Y10T 442/663; Y10T 442/643
See application file for complete search history.

(56) References Cited

U.S. PATENT DOCUMENTS

| | | | |
|---|---|---|---|
| 3,163,185 A | | 12/1964 | Stanley et al. |
| 3,473,885 A | | 10/1969 | Stanley |
| 3,642,561 A | | 2/1972 | Grobner |
| 4,048,634 A | | 9/1977 | Harding et al. |
| 4,107,371 A | | 8/1978 | Dean |
| 4,298,648 A | | 11/1981 | Turnbull |
| 4,519,435 A | | 5/1985 | Stier |
| 4,614,632 A | | 9/1986 | Kezuka et al. |
| 4,992,124 A | | 2/1991 | Kurihara et al. |
| 5,339,883 A | | 8/1994 | Colson et al. |
| 5,393,599 A | | 2/1995 | Quantrille et al. |
| 5,394,922 A | * | 3/1995 | Colson ............. B29C 65/02 160/121.1 |
| 5,566,734 A | * | 10/1996 | Levy ............... E06B 9/262 160/121.1 |
| 5,601,132 A | | 2/1997 | Goodman |
| 5,645,933 A | | 7/1997 | Sakazume et al. |
| 5,654,073 A | * | 8/1997 | Swiszcz ............ D06M 17/04 428/116 |
| 6,063,717 A | | 5/2000 | Ishiyama et al. |
| 6,302,181 B1 | * | 10/2001 | Rupel ............... E06B 9/262 160/84.05 |
| 6,321,425 B1 | | 11/2001 | Putnam et al. |
| 6,342,115 B1 | | 1/2002 | Pourmand et al. |
| 6,902,796 B2 | | 6/2005 | Morell et al. |
| 7,117,917 B2 | | 10/2006 | Allsopp |
| 7,345,004 B2 | | 3/2008 | Zenker et al. |
| 2004/0005435 A1 | * | 1/2004 | GangaRao ......... B29C 70/24 428/102 |
| 2006/0194496 A1 | * | 8/2006 | Burns ............... B32B 5/022 442/381 |
| 2007/0077843 A1 | * | 4/2007 | Harkenrider ...... B32B 7/12 442/366 |
| 2007/0141352 A1 | | 6/2007 | Calhoun et al. |
| 2007/0141937 A1 | | 6/2007 | Hendrix et al. |
| 2008/0045103 A1 | * | 2/2008 | Flippin ............. D06M 15/705 442/110 |
| 2008/0286520 A1 | | 11/2008 | Colson et al. |
| 2009/0325440 A1 | | 12/2009 | Thomas et al. |
| 2011/0126959 A1 | | 6/2011 | Holt et al. |
| 2014/0087123 A1 | | 3/2014 | Nakazawa et al. |

\* cited by examiner

FABRIC HAVING A BACKING MATERIAL FOR A COVERING FOR AN ARCHITECTURAL OPENING

RELATED APPLICATIONS

The present application is based upon and claims priority to U.S. Provisional Patent Application Ser. No. 62/185,326, filed on Jun. 26, 2015, and claims priority to PCT application No. PCT/US2016/039335, filed on Jun. 24, 2016 which is incorporated herein by reference.

TECHNICAL FIELD

This invention relates generally to coverings for architectural openings, and more specifically to a fabric having a backing material for a covering for an architectural opening.

BACKGROUND

Coverings for architectural openings, such as windows, doors, archways, and the like, have taken numerous forms for many years. The fabrics used for the coverings have presented various challenges associated with a given operation of the covering. Generally, it is desirable for the fabric of the covering to present an aesthetically pleasing appearance. For instance, it may be desirable for the covering to have a generally uniform contour, without undulations, puckering, or other contour irregularities caused by the manner in which the fabric is falling, lays, or otherwise hangs in position (in contrast with surface texture or other features of the fabric itself). Different coverings operate in different manners which move the fabric forming the covering element into extended or retracted positions (respectively covering or uncovering the architectural opening) in different manners. For instance, different coverings fold the fabric of the covering element along a given direction to retract the covering. More particularly, some coverings include operable vanes that are movable between open and closed positions. Current trends demand the use of fabrics not previously used in vane construction (e.g., lightly woven fabrics and fabric constructions that have an inherent high level of drape or other physical characteristics not amenable to the operable vane or a desired end use). Current manufacturing methods for making operable vanes of these desired fabrics have not proven sufficient to provide a consistent, preferably smooth appearance of the vane. For example, some vanes have inherent physical properties that offer poor support for uniformity and flatness in appearance. This creates a vane appearance, with creases, puckering or other undesirable non-uniform undulations and can increase the risk of significant capital investment in an unsuccessful product, and may lead to reduced quality and/or market share of the covering.

BRIEF SUMMARY

The present disclosure generally provides a fabric that has a backing so that the backed fabric offers improvements or an alternative to existing arrangements of the fabric of the shade portion of a covering for an architectural opening (herein "architectural opening covering" for the sake of convenience without intent to limit). More particularly, the present disclosure generally provides a fabric with a backing coupled thereto to modify the stiffness of the fabric along at least a first direction of the fabric to facilitate use of the fabric in a selected shade configuration. In one embodiment, the backing modifies the stiffness of the fabric to permit bending of the fabric about a first axis more readily than about a second axis perpendicular to the first axis. The backing may or may not modify the stiffness about the second axis.

In one embodiment, the fabric may be used to form an architectural opening covering having a shade employing movable vanes. The vanes formed in accordance with principles of the present invention include an outer fabric and an inner backing material connected together. The backing material is designed such that the backing material satisfies the stiffness requirements for use in a vane by, for example, increasing the stiffness of the vane along the length of the vane (extending across the width of the architectural opening covering) while negligibly affecting the stiffness of the vane perpendicular to the axis about which the vane is to bend to open and close the vane to allow viewing through the shade. Thus, according to the present disclosure, the vane is stiffer along its length but remains flexible about its height, thereby providing a flexible vane that has a consistent, preferably smoothly contoured appearance.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

The accompanying drawings, which are incorporated into and constitute a part of the specification, illustrate embodiments of the disclosure and, together with the general description above and the detailed description below, serve to explain the principles of these embodiments.

DETAILED DESCRIPTION

It is to be understood by one of ordinary skill in the art that the present discussion is a description of exemplary embodiments only, and is not intended as limiting the broader aspects of the present disclosure.

In the figures that follow, one embodiment of the present disclosure is described that comprises a shade including a support sheet and a plurality of horizontally-extending vanes that can move relative to the support sheet. It should be understood, however, that the figures are provided for purposes of explanation and in no way limit the different embodiments of the present disclosure. The present disclosure, for instance, is applicable to any suitable window covering product. For instance, roman-type shades, honeycomb shades, vertical shades, blinds, and the like, can also be made in accordance with the present disclosure. For example, in one embodiment, the present disclosure is directed to a shade comprised of a cover fabric in conjunction with a backing material in accordance with the present disclosure as described above.

Figure 1:
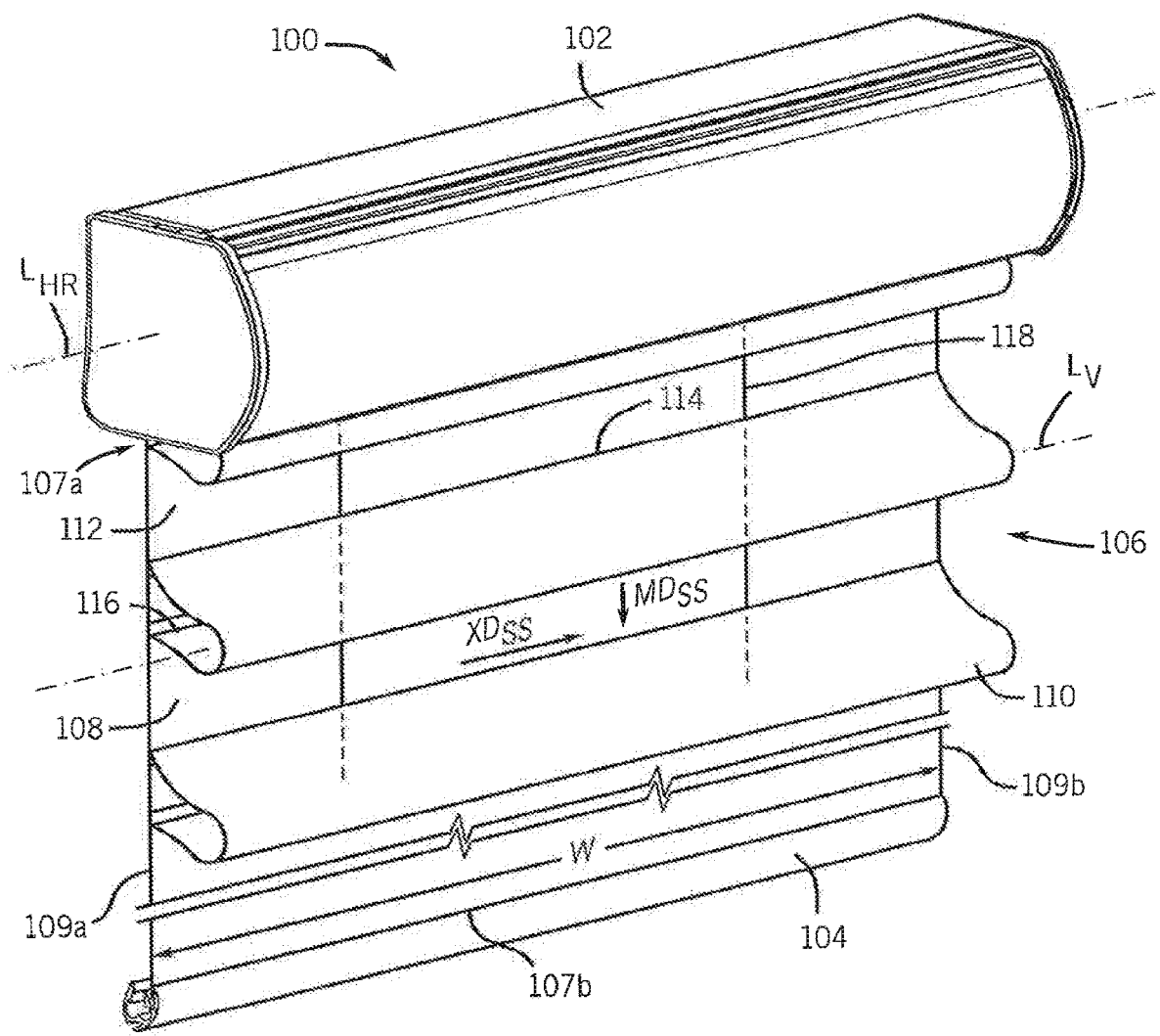
FIG. 1 is a front perspective view of a covering in accordance with an embodiment of the present disclosure.

FIG. 1 is a front perspective view of an illustrative embodiment of a covering 100 utilizing a backed fabric formed in accordance with principles of the present disclosure. As illustrated, the covering 100 is shown in a fully-extended, open configuration in accordance with some embodiments of the present disclosure. The illustrative covering 100 includes a head rail 102, a bottom rail 104, and a shade 106 extending between the head rail 102 and the bottom rail 104. The illustrative shade 106 includes a vertically-extending support sheet 108 and a plurality of horizontally-extending vanes 110 connected to the support sheet 108. The support sheet 108 in the illustrative embodiment of FIG. 1 is in the form of a flexible sheet of fabric, which may be of a substantially rectangular configuration having top and bottom edges 107a, 107b, and left and right side edges 109a, 109b. As shown, the support sheet 108, which may be constructed of knit, woven, or nonwoven materials of various levels of transparencies, is vertically-suspended from the head rail 102 along its top edge 107a. In some embodiments, the support sheet 108 may be suspended from a generally cylindrical roller rotatably mounted within the head rail 102 for selective reversible rotary movement about a horizontal central axis. The structure of the roller may allow the shade 106 to be retracted around and unwound from the roller as the roller is reversibly rotated. The structure from which the shade 106 is suspended, retracted, and extended may take on forms other than the roller in the head rail 102 as described above. Attached to the bottom edge 107b of the support sheet 108 is the bottom rail 104, which is an elongate member that may be weighted and generally maintains the shade 106 in a taut condition at its desired level of extension.

With continued reference to FIG. 1, each of the plurality of vanes 110 is suspended generally horizontally across a front face 112 of the support sheet 108 at vertically-spaced locations such that the length of the vane 110 extends along the width W of the shade 106. As shown, each vane 110 is made from resiliently flexible material or fabric, which may be light-transmissive or light blocking. In the illustrative embodiment of FIG. 1, each vane 110 includes a first edge 114 (e.g., an upper edge) and a second edge 116 (e.g., a lower edge) opposite the first edge 114. The first edge 114 of each vane 110 is attached to the front face 112 of the support sheet 108 across the width W of the support sheet 108 and at vertically-spaced locations such that the plurality of vanes 110 hang substantially parallel to the longitudinal axis $L_{HR}$ of head rail 102. The second edge 116 of each vane 110 hangs freely such that the second edge 116 of vane 110 is movable relative to the first edge 114 of vane 110 along the front face 112 of the support sheet 108. The position of the second edge 116 relative to the first edge 114 is variable based on the desired actuation and aesthetics of each vane 110 as it moves from its closed to open positions.

In the closed position, each vane 110 is substantially flat and generally parallel with the support sheet 108. In the open position, each vane 110 has a substantial teardrop shape cross-section and extends forwardly of the support sheet 108. In the embodiment of FIG. 1, the vanes 110 may be positioned in any configuration between the fully open and the fully closed configurations to achieve substantially any desired light blocking or occluding characteristics of the shade 106. To achieve the desired aesthetic effect when in the closed and/or open positions, each vane 110 includes bending properties in at least two directions, as described below.

In the embodiment shown in FIG. 1, the covering 100 includes operating elements 118 for moving the vanes 110 between open and closed positions. Each operating element 118 extends along the front face 112 of the support sheet 108 and is secured at spaced locations along its length to the second edge 116 of each vane 110 such that if the operating element 118 is lifted, the second edge 116 of each vane 110 is lifted synchronously toward the first edge 114 of each respective vane 110 so as to define a gap between the vanes 110 through which vision and/or light may pass. Because each vane 110 is made of flexible material or fabric, movement of the second edge 116 towards the first edge 114 causes the vane 110 to bend or fold about a vane longitudinal axis $L_v$ and/or expand away from the support sheet 108 as shown in FIG. 1, for instance. Accordingly, transitioning the vanes 110 from a closed position to an open position causes the cross-section of each vane 110 to change from a generally planar configuration in the closed position to a generally arcuate configuration in the open position. In the illustrative embodiment of FIG. 1, the operating elements 118 slidably pass between the support sheet 108 and the first edge 114 of each vane 110, and in such locations, the first edge 114 is not attached to the support sheet 108 to allow the operating elements 118 to move relatively between the first edge 114 and the support sheet 108. The operating elements 118 are shown as monofilament cords but can assume other various forms, including but not limited to strips of fabric or other materials, cords of synthetic or natural fibers, or other similar forms. The operating elements 118 may have a variety of cross-sections, including circular, oval, rectangular, square, or other geometric shapes. The operating elements 118 need not be attached to every vane 110, but instead may be attached to specific vanes 110 that are desired to be movable between open and closed positions. It will be appreciated that instead of passing between the first edge 114 and the support sheet 108, the operating elements 118 may pass through the support sheet 108, or through the vane 110.

Figure 2:
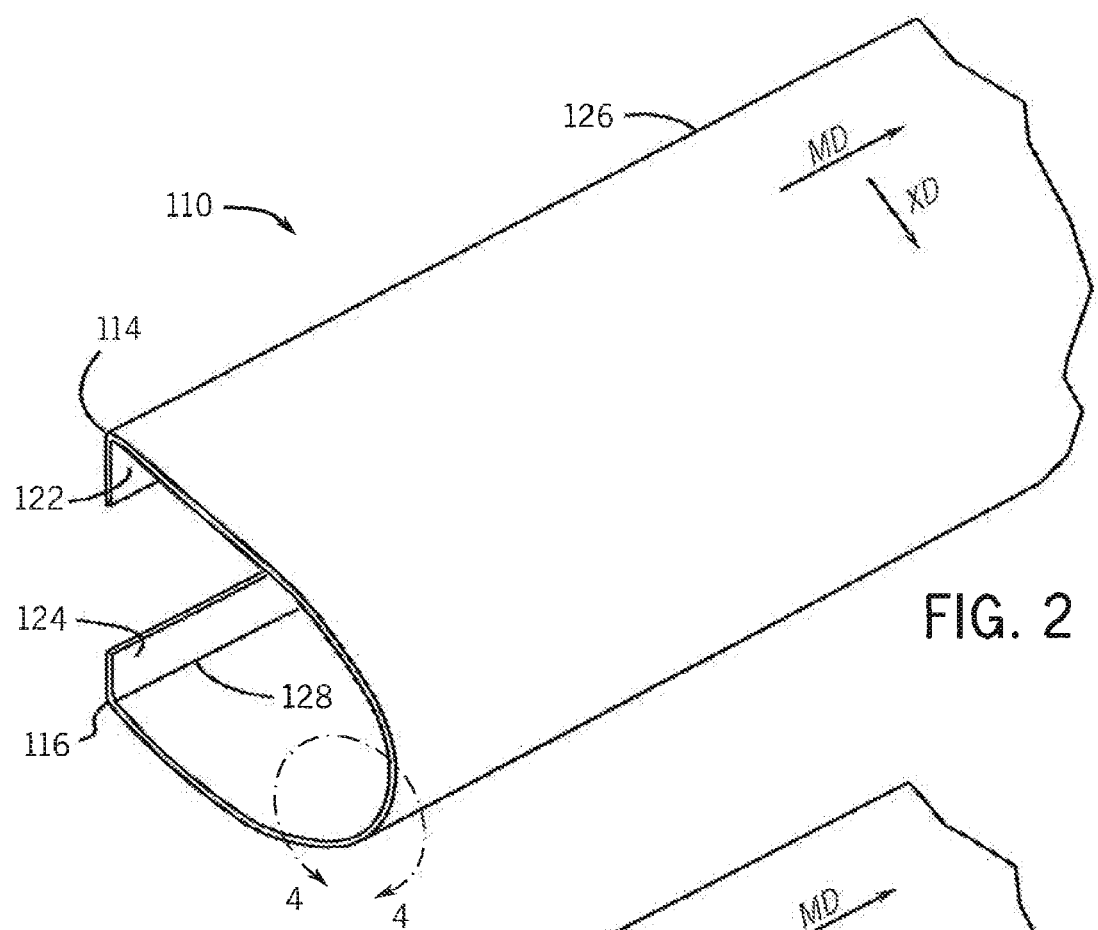
FIG. 2 is a front perspective view of a vane of the covering of FIG. 1 and in an open configuration in accordance with an embodiment of the present disclosure.

FIG. 2 is a front perspective view of an illustrative embodiment of the vane 110 in accordance with principles of the present disclosure. As shown in FIG. 2, the machine direction MD of the fabric used to form the vane 110 is the direction in which the fabric is processed during assembly. In the illustrative example of FIG. 2, the machine direction MD thus extends along the length of the vane 110 such that when the vane 110 is connected to the support sheet 108 as part of the complete covering 100, the machine direction MD extends along the length of the vane 110 and across the width W of the support sheet 108 between the left and right side edges 109*a*, 109*b* of the support sheet 108. In the illustrative embodiment, the cross direction XD of the fabric used to form the vane 110 extends transversely to the machine direction MD, and in the illustrative example of FIG. 2, is thus along the height of the vane 110. When the vane 110 is connected to the support sheet 108 as part of the complete covering 100, the cross direction XD of each vane 110 extends vertically between the top and bottom edges 107*a*, 107*b* of the support sheet 108 (and between the first and second edges 114, 116 of each vane 110). Although described above as extending along the length of the vane 110 and across the width W of the support sheet 108, it is contemplated that the machine direction MD of the fabric used to form the vane 110 need not correspond to the length of the vane 110, and could instead correspond to, for example, the height of the vane 110, depending on the design of the product in which the fabric is used. In other words, the machine direction MD and the cross direction XD of the fabric used to form the vane 110 may, in other configurations, be oriented substantially perpendicular to respective machine and cross directions $MD_{SS}$, $XD_{SS}$ of the support sheet 108 (see FIG. 1).

In the illustrative embodiment of FIG. 2, the stiffness of each vane 110 in its machine direction MD and in its cross direction XD is tailored to achieve a desired stiffness characteristic, and thus the desired aesthetic effect, when the vane 110 is in the closed and/or open positions. For example, the vane 110 of FIG. 2 has sufficient stiffness in its machine direction MD (i.e., machine-direction stiffness) to provide fabric with a contour that has a consistent, preferably smooth appearance throughout the vane 110 to reduce ripples 120 or undulations within the vane 110, as explained below (see FIG. 3). Additionally, the stiffness of the vane 110 of FIG. 2 in its cross direction XD (i.e., cross-direction stiffness) permits the vane 110 to remain flexible for resilient bending of the vane 110 during opening and closing, as described above. In this manner, a greater variety of fabrics may be used to construct the vane 110, including soft hand fabrics not previously feasible for use in vane construction. Soft hand fabrics refer to fabrics that are very flexible and soft to the touch. A soft hand fabric may not possess good drape characteristics when incorporated into a window covering. In the exemplary embodiment of FIG. 2, the vane 110 includes an upper tab 122 and a lower tab 124, each optionally defined by respective upper and lower creases 126, 128 or fold lines. Each tab 122 and 124 preferably folds rearwardly from the front surface of the vane. The creases 126, 128 define the first and second edges 114, 116 of the vane 110 (see FIG. 2). The upper tab 122 may be used for attaching the first edge 114 of the vane 110 to the support sheet 108. Similarly, the lower tab 124 may be used for attaching the second edge 116 of the vane 110 to the operating elements 118 to allow for selective movement of the vane 110 between the open and closed configurations. It will be appreciated that the tabs 122 and 124 are not a required feature of the vane 110, which may have only one tab or no tabs.

Figure 3:
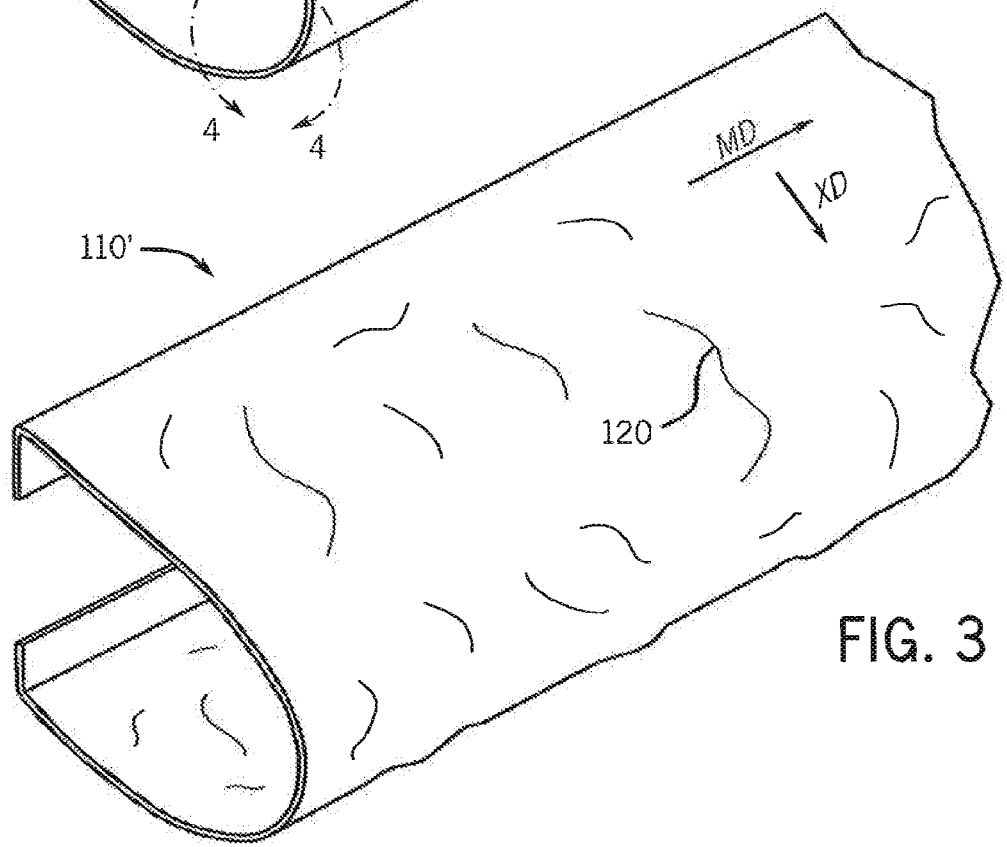
FIG. 3 is a front perspective view of a vane without a fabric backing and in an open configuration.

FIG. 3 is a front perspective view of an alternative embodiment of the vane 110' in accordance with principles of the present disclosure. In substantially all respects, the vane 110' of FIG. 3 is identical to the vane 110 of FIG. 2. However, as illustrated in FIG. 3, the vane 110' does not have sufficient stiffness in its machine direction MD to provide a fabric that has a contour with a consistent, smooth, appearance throughout as compared to the vane 110 illustrated in FIG. 2. Because of insufficient stiffness in its machine direction MD, the vane 110' of FIG. 3 includes regions of "puckering" or gathering of the fabric to cause ripples 120, undulations, or waviness within the vane 110' (e.g., on a surface of the vane 110'). This "puckering" causes inconsistencies in appearance and performance of the vane 110 and may be undesirable for at least certain applications.

Figure 4:
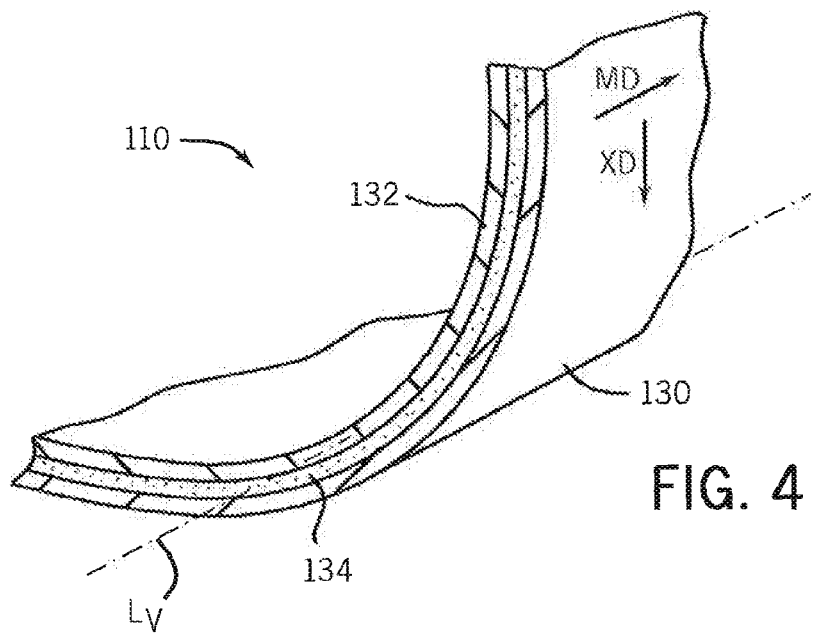
FIG. 4 is an enlarged detail view of the vane of FIG. 2 in accordance with an embodiment of the present disclosure.
Figure 5:
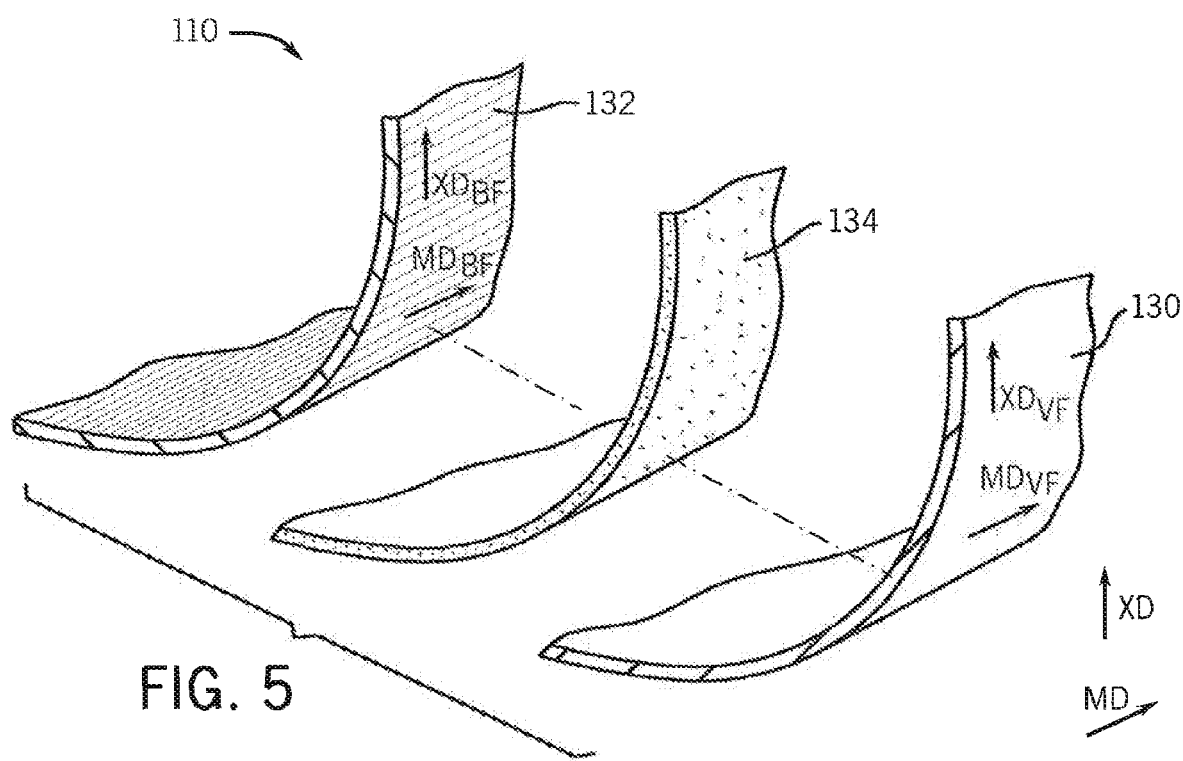
FIG. 5 is an enlarged, exploded detail view of the vane of FIG. 2 in accordance with an embodiment of the present disclosure.

FIG. 4 is an enlarged detail view of an illustrative embodiment of the vane 110 of FIG. 2 in accordance with principles of the present disclosure. FIG. 5 is an enlarged exploded view of the vane 110 of FIG. 4 in accordance with principles of the present disclosure. As shown in FIGS. 4 and 5, the vane 110 includes a fabric 130 and a backing material 132 connected to the fabric 130 (e.g., to a rear of the fabric 130) to enhance the desired properties of the fabric 130 in a first direction (e.g., to enhance stiffness along the length of the vane 110 extending about the width W of the shade 106 which is not intended to bow or bend or otherwise fold or bend), to reduce or eliminate any unintended or incidental "puckering" or ripples 120 in the vane 110, and to maintain the desired property of the fabric 130 in a second direction (e.g., to maintain flexibility of the vane about the bending axis of the vane so that the vane readily bends into an open or closed configuration as desired).

The vane 110 may be formed as a laminate structure of the fabric 130 and the backing material 132 (and adhesive), and may alternatively be referenced as a "vane laminate." The fabric 130, which may be referred to as a vane fabric, an outer fabric, a fabric material portion, or a first material, and the backing material 132 may be connected together by a layer of adhesive 134 (e.g., a thermoplastic adhesive) positioned between the fabric 130 and the backing material 132. Thus, the fabric 130 and the backing material 132 form discrete layers of the laminate structure (e.g., as shown in FIGS. 4 and 5), with such respective layers being adhesively bonded together via the adhesive 134. Many different types and structures of adhesive 134 can be used, which can be applied by spray, gravure, roll coating, die cast extrusion, or by any other suitable manner. Selection of adhesive type and/or structure depends upon the desired characteristics and/or properties of the formed vane 110. For example without limitation, a crosslinking adhesive may be used for high temperature end use applications, and a thermoplastic adhesive may be selected for moderate temperature end use applications. In each of the embodiments described herein, the adhesive 134 may or may not be relatively inert to the physical characteristics (e.g., stiffness) of the vane laminate. In the illustrative embodiment of FIGS. 4 and 5, the layer of adhesive 134 is a melt blown adhesive sprayed onto the web structure of at least one of the fabric 130 and the backing material 132 and solidifies with little to no shrinkage. Although FIGS. 4 and 5 depict the layer of adhesive 134 as a continuous layer (in both cross-section and along its length), the layer of adhesive 134 may be a discontinuous web or dot structure. In such embodiments, a section view of the layer of adhesive 134 may appear discontinuous or continuous depending on the section line. In certain embodiments, the type of adhesive used, the manner in which the adhesive is applied, and the amount of adhesive applied in between the backing material in the fabric can further influence the stiffness properties, particularly the stiffness ratio, of the resulting laminate. For example, in one embodiment, the adhesive can also be applied in a unidirectional manner that cooperates with the backing material in increasing the stiffness ratio. In one embodiment, the adhesive may be applied as fibers or filaments. For instance, unidirectionally oriented meltblown fibers may be used as the adhesive.

Applying the adhesive in a discontinuous manner may, in some embodiments, better preserve the flexibility of the resulting laminate. For example, as described above, the adhesive may be applied in a discontinuous pattern, such as a dot pattern. In this embodiment, the adhesive may cover less than 80%, such as less than about 70%, such as less than about 60%, such as less than about 50%, such as less than about 40%, such as less than about 30% of the surface area of the fabric. The adhesive generally covers greater than about 10% of the surface area, such as greater than about 20% of the surface area, such as greater than about 30% of the surface area.

According to the present disclosure, almost any type of fabric 130, particularly fabrics with a soft hand, regardless of its inherent properties, may be used for a desired purpose (e.g., any of a variety of shades 106 or vanes 110 with different bending and/or draping requirements) by application of the backing material 132 thereto to modify the stiffness (and stabilize elongation to improve manufacturing versatility) of the fabric 130 in the desired manner without otherwise significantly affecting the other properties of the fabric 130, such as thickness, weight, and/or light transmissivity of the fabric 130. Thus, the backing material 132 may be applied to a variety of fabrics 130 to modify the stiffness ratio of the fabric 130 to achieve a desired flexibility and stiffness characteristics of the laminate for the ultimate application and use of the fabric, such as, without limitation, as a vane in a shade. It is contemplated that the backing material 132 may modify or enhance, based on its inherent physical properties and application, the properties of the fabric 130 in substantially any direction based on a desired end use of the vane laminate. However, for ease of reference and as an illustrative example, the present disclosure describes the stiffness and flexibility of the fabric 130 in terms of machine direction and cross direction. As noted above, the machine direction MD and cross direction XD typically correspond, in the illustrative embodiment of FIG. 4, to length and height, respectively, of the fabric 130 used to form the vane 110. It is contemplated, however, that the machine direction and the cross direction of the fabric 130 do not necessarily correspond to the length and height of the vane 110, respectively, when the vane 110 is implemented in the shade 106. Thus, it should be appreciated that the specific orientations described herein (e.g., machine direction and cross direction) are for illustration purposes and for ease of reference and do not define the scope of the present disclosure.

The fabric 130 and the backing material 132 may be made of any suitable material, including but not limited to woven or nonwoven fabrics of natural or man-made materials, including vinyl, plastic, or other such materials. In the illustrative embodiments of FIGS. 4 and 5, however, the backing material 132 is a directional nonwoven material, although non-directional woven and nonwoven fabrics or materials are also contemplated. The backing material 132, which may be referred to as an inner fabric, a backing material portion, or a second material and may be sheer, may be formed from a plurality of fiber segments oriented primarily along the longitudinal axis Lv of the vane 110 (i.e., along the machine direction MD of the vane 110). In some embodiments, the backing material 132 may be formed from aligned continuous fibers, yarns, and/or carded, aligned staple fibers that have some fiber overlapping. Additionally or alternatively, the backing material 132 may be formed from a plurality of generally parallel rows, each row including a plurality of longitudinal fibers substantially oriented and overlapping along the row, the rows extending along the longitudinal axis Lv of the vane 110 with little or no cross-linking between the rows. Thus, in the illustrative embodiments of FIGS. 4 and 5, the backing material 132 may have a "grain" or striated appearance in one direction (e.g., in the machine direction MD of the vane 110) such that the fibers appear to be in a "combed" web structure.

Accordingly, the fiber orientation of the backing material 132 enhances or increases, sometimes significantly, for instance by multiples, the machine-direction stiffness of the vane 110 about an axis, such as in its machine direction MD. Additionally, because the fibers of the backing material 132 extend mainly along the machine direction MD of the vane 110, with little cross-linking between rows, the backing material 132 maintains as constant and/or slightly affects the cross-direction stiffness of vane 110, thus maintaining the bending properties of the vane 110 in its cross direction XD. In some embodiments, the backing material 132 may be configured with increased cross-linking between rows to achieve a more equal machine direction to cross direction fiber distribution such that the vane 110 achieves a desired stiffness to operate properly for a particular application.

In one embodiment, the backing material 132 comprises a meltspun web or a laminate containing a meltspun web. In accordance with the present disclosure, the meltspun web includes fibers that are oriented in one direction for increasing the stiffness of the material in the direction of orientation. The meltspun web, for instance, may comprise a spunbond web, a meltblown web, a hydroentangled web, a coform web, and the like. The meltspun web can be made exclusively from continuous filaments, can be made exclusively from staple fibers, or can be comprised of a combination of continuous filaments combined with staple fibers.

In addition to meltspun webs, the backing material 132 may comprise any other suitable nonwoven web or laminate. The nonwoven web, for instance, may comprise a wetlaid web, an airlaid web, a bonded carded web, and/or a cross-lapped web in which the web contains fibers that have been unidirectionally oriented.

The backing material 132 can have various different characteristics and properties depending upon the particular application, as long as the material is capable of being adhered to another fabric and includes unidirectionally oriented fibers and/or greater stiffness properties in one direction. For example, in certain embodiments, the backing material 132 can have a relatively light basis weight. Using a backing material with a relatively light basis weight can provide various advantages and benefits. For instance, a relatively light basis weight material can provide the necessary stiffness adjustment to a fabric without significantly interfering with the opacity characteristics of the fabric. In addition, it was discovered that lightweight basis materials can dramatically and unexpectedly improve the elongation properties of a fabric. When using a relatively light basis weight material, the backing material can have a basis weight of generally less than about 20 gsm, such as less than about 17 gsm, such as less than about 15 gsm, such as less than about 13 gsm, such as less than about 10 gsm, such as less than about 8 gsm, such as less than about 5 gsm, such as even less than about 3 gsm. The backing material generally has a basis weight greater than 1 gsm.

In an alternative embodiment, the backing material can also have a relatively heavy basis weight. For instance, the basis weight of the backing material can be greater than about 20 gsm, such as greater than about 30 gsm, such as greater than about 40 gsm, such as greater than about 50 gsm, such as greater than about 60 gsm. The basis weight of the backing material is generally less than about 150 gsm, such as less than about 120 gsm. Heavier basis weight materials may be desired in certain applications, especially when producing laminates that are designed to block light.

The backing material 132 can also be produced from various different fibers and filaments. In one embodiment, for instance, the backing material is made exclusively from synthetic fibers, filaments, or a combination of fiber and filaments. For example, the backing material can be made from polyester, a polyolefin such as polyethylene or polypropylene, an acrylic, or mixtures thereof. The backing material can also contain other fibers, including cellulose fibers, regenerated cellulose fibers such as rayon, cotton fibers, and the like.

One example of a suitable backing material 132 includes MILIFE® T-Grade MD-only nonwoven, a 100% polyester nonwoven material manufactured by JX Nippon. MILIFE® T-Grade MD-only nonwoven comes in a variety of grades, including T10, which has a basis weight of 10 g/m² and a tensile strength of 50 N/50 mm. Other fabrics or materials may be utilized for the backing material 132 depending on the particular application, including fabrics having a variety of ratios between machine direction and cross direction fiber distributions operable to affect the physical properties of the vane 110 in a low profile manner.

In an alternative embodiment, the backing material 132 comprises a unidirectionally oriented hydroentangled web. In one embodiment, the hydroentangled web can have a relatively low basis weight such as less than about 20 gsm, such as less than about 17 gsm, such as less than about 15 gsm, such as less than about 13 gsm, such as less than about 10 gsm, such as less than about 8 gsm. The basis weight is generally greater than about 2 gsm, such as greater than about 5 gsm, such as greater than about 7 gsm.

In one embodiment, the hydroentangled web is made from a precursor web comprising a spunbond web made from continuous polymeric filaments. The precursor or spunbond web is placed on a foraminous surface and subjected to the hydroentangling process. Hydroentanglement is affected by application of high pressure liquid streams to the web. Filaments of the web are rearranged on the fabric forming surface of the device. In one embodiment, the forming surface and the liquid streams act in conjunction to rearrange the filaments of the web and to create a unidirectionally oriented web that has sufficient integrity and strength for handling. In order to form the web, filaments can be used having a really low denier. For instance, the filaments can have a denier of less than about 3.0, such as less than about 2.5, such as less than about 2.0, such as less than about 1.5, such as less than about 1.0, such as less than about 0.8, such as less than about 0.5. The denier of the filaments is generally greater than about 0.2, such as greater than about 0.5, such as greater than about 1.0.

In one embodiment, the spunbond precursor web comprises a web that has been lightly bonded which allows the high pressure fluid streams to break or disrupt the bonds without breaking the continuous filaments. As a consequence, a relatively low basis weight web can be formed made from substantially continuous filaments that have been unidirectionally oriented. If desired, after hydroentangling, the spunbond and hydroentangled web can be subjected to further bonding processes, such as thermal bonding.

In an alternative embodiment, a unidirectionally oriented hydroentangled web may be used as the backing material which comprises two or more webs that have been hydroentangled together. For example, in this embodiment, a unidirectionally oriented nonwoven web can be hydroentangled with one or more other nonwoven webs to result in a unidirectionally oriented structure that has sufficient strength and integrity for handling and incorporation into fabric laminates.

The unidirectionally oriented web that is subjected to hydroentangling can be made using different processes and techniques. In one embodiment, for instance, the web may comprise a meltspun web, such as a spunbond or meltblown web, that has been stretched in one direction for unidirectionally orienting the fibers. The nonwoven web can be stretched, for instance, using rollers that operate at different speeds. Alternatively, stretching can occur on a tenter frame. The draw ratio of the unidirectionally oriented nonwoven fabric, for instance, can be from about 5 to about 20, such as from about 8 to about 12. The nonwoven web can be made from staple fibers, continuous filaments, or mixtures thereof. The fibers and filaments can have a denier of from about 0.01 to about 10, such as from about 0.03 to about 5.

The unidirectionally oriented web is then hydroentangled with at least one other nonwoven web. The nonwoven web can comprise any suitable fiber web or nonwoven fabric. For instance, in one embodiment, the unidirectionally oriented web is hydroentangled with a carded web. The carded web can be made from staple fibers having any of the denier ranges described above. The two webs are then hydroentangled together in order to produce a nonwoven material not only having unidirectionally oriented fibers but also having sufficient integrity and strength to be later processed. The resulting nonwoven material can have a basis weight of from about 8 gsm to about 150 gsm. In one embodiment, for instance, the material has a relatively light basis weight of less than about 25 gsm, such as less than about 20 gsm, such as less than about 15 gsm, such as less than about 12 gsm, such as less than about 10 gsm. The basis weight is generally greater than about 3 gsm, such as greater than about 5 gsm.

In yet another embodiment of the present disclosure, the backing material 132 may be formed directly on one side of the fabric 130. For example, any suitable nonwoven web having unidirectionally oriented fibers or filaments may be applied directly to the fabric 130 in accordance with the present disclosure. The nonwoven web, for instance, may comprise a spunbond web, a meltblown web, a coform web, or the like. By applying the backing material 132 directly to the fabric 130, the backing material can have a very low basis weight. For instance, the backing material 132 can have a basis weight of less than about 15 gsm, such as less than about 12 gsm, such as less than about 10 gsm, such as less than about 8 gsm, such as less than about 5 gsm, such as even less than about 3 gsm. In one embodiment, for instance, unidirectionally oriented fibers, filaments, or mixtures thereof can be applied directly to the fabric 130 in a manner that produces little to no crossover points that are typically present in nonwoven webs.

The above described backing materials when attached to a fabric are all capable of adjusting the stiffness of the fabric in one direction. In particular, the stiffness is increased in a first direction without significantly affecting the stiffness in a second and perpendicular direction. In the figures, the first direction is the machine direction, while the second direction is the cross-direction. It should be understood, however, that the stiffness of a fabric can be increased in any suitable direction depending upon the particular application. In the illustrative embodiments of FIGS. 4 and 5, the ratio between the machine-direction stiffness and the cross-direction stiffness (i.e., stiffness ratio) of the vane 110 having the backing material 132 attached thereto is between about 1.5:1 and about 18:1. In various embodiments, the stiffness ratio of laminates made according to the present disclosure (first direction to second direction) can generally be greater than about 2:1, such as greater than about 3:1, such as greater than about 4:1, such as greater than about 6:1, such as greater than about 8:1, such as greater than about 10:1, such as greater than about 12:1, such as greater than about 14:1. The stiffness ratio is generally less than about 50:1, such as less than about 40:1, such as less than about 30:1, such as less than about 20:1. Certain fabrics or materials have stiffness ratios within the range mentioned above without the use of the backing material 132. However, the backing material 132 can be used on substantially any type of fabric or material, including but not limited to densely or lightly wovens or nonwovens, lightweight woven sheers, lightweight nonwovens, and lightweight knits, to enhance its respective stiffness ratio. For example, the backing material 132 is not only able to enhance materials having a poor stiffness ratio, the backing material 132 may also be used to selectively enhance and support materials that have a desired stiffness ratio but do not have a desired stiffness in general. For example without limitation, for fabrics 130 having a stiffness ratio equal to or greater than 1:1, the backing material 132 may include less machine direction orientation compared to a backing material 132 used for a fabric 130 having a stiffness ratio less than 1:1. Additionally or alternatively, for fabrics 130 having a desired stiffness ratio but lacking stiffness in general, the backing material 132 may be unbiased such that the backing material 132 has an equal machine direction to cross direction fiber distribution (see FIG. 5), resulting in a more balanced enhancement of the stiffness of the vane 110 in both its machine direction MD and its cross direction XD. For fabrics having a desired stiffness ratio, the backing material 132 may have a relatively light basis weight that may desirably influence the elongation properties of the fabric without significantly impacting the opacity of the fabric. For instance, the backing material, in this embodiment, can have a basis weight of less than about 12 gsm, such as less than about 10 gsm, such as less than about 8 gsm, such as less than about 6 gsm, such as less than about 4 gsm. The basis weight of the backing material is generally greater than about 1 gsm.

Illustrative examples of increases in stiffness ratio with respect to various fabrics or materials are shown below in Tables 1-3. The various fabrics or materials shown in Tables 1-3 below were tested using a Handle-O-Meter testing machine, developed by Johnson & Johnson and now manufactured by Thwing-Albert, that measures the combination of surface friction and flexibility of sheeted materials (i.e., the handle of the fabric). All of the materials were tested face side down on the testing machine. Although the various fabrics and materials in Tables 1-3 were tested using a Handle-O-Meter testing machine, any suitable stiffness measurement technique for fabrics would suffice in comparing the relative machine-direction stiffness and cross direction-stiffness of the vane 110 so long as the measurement technique is capable of distinguishing measurements at least between machine direction and cross direction.

Table 1 below shows Handle-O-Meter test results using "Polyester Woven A" as the fabric 130. Polyester Woven A is a mid-weight (100 gsm-150 gsm), plain weave, 100% polyester, woven construction. In row 1, Polyester Woven A was tested without the backing material 132. In row 2, Polyester Woven A was tested with the backing material 132 applied thereto. Rows 3-4 illustrate test data of Polyester Woven A with various conventional backing materials applied thereto for comparison with the backing material 132. Although Table 1 illustrates test results using Polyester Woven A, similar results can be achieved for substantially any woven material whose stiffness ratio is heavily biased towards one direction (e.g., its cross-direction stiffness).

TABLE 1

"Polyester Woven A" Handle-O-Meter Test Results

| | Material Description | Machine-Direction Stiffness (Ave.) | Cross-Direction Stiffness (Ave.) | Stiffness Ratio |
|---|---|---|---|---|
| 1 | Polyester Woven A - without backing material 132 | 15.5 | 46.8 | 0.33:1 |
| 2 | Polyester Woven A - with backing material 132 | 75.2 | 44.5 | 1.69:1 |
| 3 | Polyester Woven A - with 20 gsm Unitika spun bound nonwoven | 80.6 | 78.2 | 1.03:1 |
| 4 | Polyester Woven A - with H&V 17 gsm smooth calendered nonwoven | 69.0 | 82.0 | 0.84:1 |

Table 2 below shows Handle-O-Meter test results using "Polyester Woven B" as the fabric 130, and shows stiffness testing with and without the backing material 132 of the present disclosure applied thereto. Polyester Woven B is a heavy-weight (greater than 150 gsm), plain weave, 100% polyester, woven construction. In row 1, Polyester Woven B was tested without the backing material 132. In row 2, Polyester Woven B was tested with the backing material 132 applied thereto in accordance with the present disclosure.

TABLE 2

"Polyester Woven B" Handle-O-Meter Test Results

| | Material Description | Machine-Direction Stiffness (Ave.) | Cross-Direction Stiffness (Ave.) | Stiffness Ratio |
|---|---|---|---|---|
| 1 | Polyester Woven B - without backing material 132 | 17.6 | 45.6 | 0.39:1 |

TABLE 2-continued

"Polyester Woven B" Handle-O-Meter Test Results

| | Material Description | Machine-Direction Stiffness (Ave.) | Cross-Direction Stiffness (Ave.) | Stiffness Ratio |
|---|---|---|---|---|
| 2 | Polyester Woven B - with backing material 132 | 84.7 | 55.1 | 1.54:1 |

Table 3 below shows Handle-O-Meter test results using "Polyester Woven C" as the fabric 130, and shows stiffness testing with and without the backing material 132 of the present disclosure applied thereto. Polyester Woven C is a lightweight (less than 100 gsm), plain weave woven composed of 100% polyester woven material. In row 1, Polyester Woven C was tested without the backing material 132. In row 2, Polyester Woven C was tested with the backing material 132 applied thereto in accordance with the present disclosure.

TABLE 3

"Polyester Woven C" Handle-O-Meter Test Results

| | Material Description | Machine-Direction Stiffness (Ave.) | Cross-Direction Stiffness (Ave.) | Stiffness Ratio |
|---|---|---|---|---|
| 1 | Polyester Woven C - without backing material 132 | 13.7 | 2.2 | 6.23:1 |
| 2 | Polyester Woven C - with backing material 132 | 57.8 | 3.7 | 15.62:1 |

As shown in Tables 1-3 above, the stiffness ratio of each of the tested fabrics or materials was substantially increased through the application of the backing material 132 to the fabric 130. In fact, for the tested fabrics or materials, the backing material 132 selectively increases the machine-direction stiffness at least about 1.5 times greater, and more preferably at least about 2 times greater, and more preferably approximately 5 times greater, than the effect of the backing material 132 on the cross-direction stiffness. For example, with reference to Table 1, application of the backing material 132 to the Polyester Woven A fabric 130 resulted in an approximate 5% decrease in cross-direction stiffness but also an approximate 385% increase in machine-direction stiffness, or an approximate 77 times greater effect on the machine-direction stiffness than the effect on the cross-direction stiffness of the vane 110. Similar results are shown in Table 2, which provides an approximate 18 times greater effect on the machine-direction stiffness than the effect on the cross-direction stiffness of the Polyester Woven B fabric 130. Similarly, Table 3 shows an approximate 5 times greater effect on the machine-direction stiffness than the effect on the cross-direction stiffness of the Polyester Woven C fabric 130. In contrast as shown in Table 1 above, use of conventional backing materials, such as 20 gsm 100% polyester Unitika spun bound nonwoven, Hollingsworth & Vose 17 gsm 100% polyester smooth calendered nonwoven (5-pressure), and Hollingsworth & Vose 17 gsm 100% polyester smooth calendered nonwoven (10-pressure), increases both the machine-direction stiffness and the cross-direction stiffness of the vane 110 without the selective bias towards significantly increasing only the machine-direction stiffness while only slightly affecting (increasing or decreasing) the cross-direction stiffness of the vane 110 as with the backing material 132 of the present disclosure. As can be seen in Tables 1-3, use of the backing material 132 increases the stiffness of the vane 110 in its machine direction MD while maintaining the flexibility of the vane 110 in its cross direction XD, unlike use of conventional backing materials as shown in Table 1. As illustrated in Tables 1 and 2, for fabrics 130 having a stiffness ratio less than 1:1, the backing material 132 may be operable to "flip" the stiffness ratio by significantly increasing machine-direction stiffness while marginally affecting cross-direction stiffness, or vice-versa. Thus, according to an embodiment of the present disclosure, strength and/or stiffness deficiencies of the fabric 130 can be overcome through application of the backing material 132 to the fabric 130.

As indicated by the tables above, a backing material 132 can be selected so as to influence the stiffness properties of the fabric in a manner desired for a particular application. In general, the backing material, when applied to a fabric, can increase the stiffness of the fabric in a first direction by greater than about 2 times, such as greater than about 3 times, such as greater than about 4 times, such as even greater than about 5 times the original stiffness of the fabric. In contrast, the stiffness in the second direction can remain substantially unaffected. For instance, applying the backing material to the fabric can increase the stiffness in the second direction by less than about 2 times, such as less than about 1.5 times, such as less than about 1 times, such as less than about 0.5 times the original stiffness of the fabric. In addition, as described above, the stiffness ratio of the fabric after the backing material is applied can increase at least about 1.5 times greater, such as at least about 2 times greater, such as at least about 2.5 times greater, such as at least about 3 times greater, such as at least about 3.5 times greater, such as at least about 4 times greater, such as at least about 4.5 times greater, such as at least about 5 times greater, such as at least about 5.5 times greater, such as at least about 6 times greater than the original stiffness ratio of the fabric. The stiffness ratio is generally increased less than 50 times greater, such as less than about 40 times greater, such as less than about 30 times greater, such as less than about 20 times greater than the original stiffness ratio of the fabric.

With continued reference to FIGS. 4 and 5, depending on the physical characteristics of the fabric 130, the backing material 132 may be selected and/or the properties of the backing material 132 may be tailored to produce a variety of vanes 110 that behave similarly in the covering 100. For example, through targeted selection of respective backing materials 132, a variety of fabrics 130 each having different physical characteristics may be used to produce respective vanes 110 that have similar properties (e.g., weight, machine-direction stiffness, cross-direction stiffness). Thus, fabrics 130 not having desired stiffness characteristics alone may be used for a particular purpose (e.g., any of a variety of shades 106 or vanes 110 with different bending and/or draping requirements) by application of the backing material 132 thereto to achieve the desired stiffness of the resulting vane laminate to suit the needs of a particular end use. In the embodiments described herein, the backing material 132 may modify the bending and draping characteristics of the fabric 130 without otherwise significantly affecting other properties of the fabric 130, such as but not limited to thickness, basis weight, and/or the opacity of the fabric 130.

With reference to FIG. 5, the fabric 130 includes a machine direction $MD_{VF}$ and a cross direction $XD_{VF}$. Similarly, the backing material 132 includes a machine direction $MD_{BF}$ and a cross direction $XD_{BF}$. As shown, the respective machine directions $MD_{VF}$, $MD_{BF}$ of the fabric 130 and the backing material 132 extend parallel to each other and parallel to the machine direction MD of the vane 110. Similarly, the respective cross directions $XD_{VF}$, $XD_{BF}$ of the fabric 130 and the backing material 132 extend parallel to each other and parallel to the cross direction XD of the vane 110. In an alternative embodiment, however, the machine direction of the fabric 130 and the machine direction of the backing material 132 may be arranged perpendicular to each other depending upon the construction of the different fabric materials. Similarly, the cross direction of the fabric may be perpendicular to the cross direction of the backing material. In the illustrative embodiment of FIG. 5, the backing material 132 may be sized identically to the fabric 130. In some embodiments, the fabric 130 may have relatively greater dimensions such that an upper portion and/or a bottom portion of the fabric 130 may be folded over the backing material 132 toward the support sheet 108 to respectively form the upper and lower tabs 122, 124 and the upper and lower creases 126, 128 of the vane 110 (see FIG. 2). In such embodiments, the adhesive 134 may facilitate in setting and/or holding at least one of the upper and lower creases 126, 128. Additionally or alternatively, the backing material 132 may help achieve better fold or crease retention in the vane 110. Also, when the backing material 132 is applied to the fabric 130, the vane 110 may be more easily scored and bent.

The relative dimensions of the fabric 130, the layer of adhesive 134, and the backing material 132 are exaggerated in FIG. 5 for illustrative purposes. In practice, the layer of adhesive 134 and the backing material 132 add limited thickness and weight to the fabric 130, although the thickness and weight of the adhesive 134 and the backing material 132 may be tailored to achieve a desired aesthetic and/or strength characteristic. For example, in an illustrative embodiment, the layer of adhesive 134 and the backing material 132 contribute about 10 to about 30 grams per square meter in weight and/or add between about 0.02 and about 0.06 mm in thickness to the vane 110. Also, although the adhesive 134 is shown as a substantial layer in FIG. 5, the adhesive 134 may be less substantial in practice and appear thin like a web of interconnected adhesive fibers or a dot coated hot melt adhesive.

Figure 6:
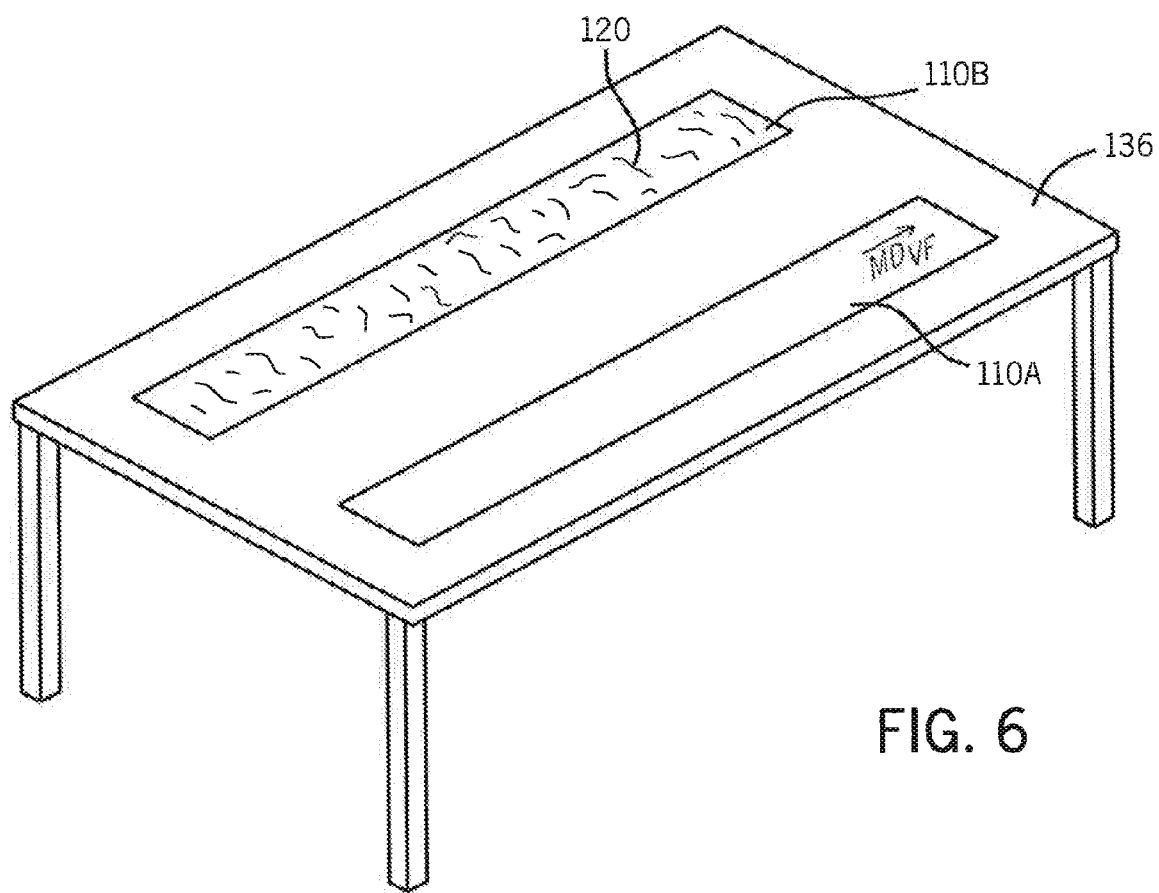
FIG. 6 is a comparative view of a vane having a backing material and a vane without a backing material in accordance with an embodiment of the present disclosure. The two vanes are shown in a flat, or closed, configuration.

FIG. 6 is a comparative view of illustrative embodiments of a vane 110A having a backing material 132 and a vane 110B without a backing material 132. Without the backing material 132, the vane 110B may "pucker" to create irregularities in surface contour and topography (e.g., creating ripples 120). This "puckering" transmits to the finished vane 110 and is visible in use. As can be seen in FIG. 6, the backing material 132 reduces the amount of "puckering" within the vane 110 by stabilizing the fabric 130 in at least one direction (e.g., its machine direction $MD_{VF}$). For example, the backing material 132 is operable to prevent stretching of the fabric 130 in the least one direction (e.g., its machine direction $MD_{VF}$). As illustrated in FIG. 6, the backing material 132 causes the fabric 130 to lie flat against, for example, a work surface 136 as shown in FIG. 6 or against the support sheet 108 in operation. As a result, a consistent, preferably smooth, appearance is achieved without adversely affecting the "feel" and the look of the fabric 130 or its function during operation, at least from a front side view of the vane 110. In some embodiments, the backing material 132, and in particular the fibers of the backing material 132, is not visible to a user when the vane 110 is implemented in the shade 106 even under backlighting conditions.

In one embodiment, for instance, a backing material is selected that does not significantly impact the opacity of the fabric 130. Consequently, in one embodiment, the backing material can advantageously influence the stiffness of the fabric 130 without significantly impacting the light transmission properties of the fabric. For example, in certain embodiments, a backing material can be selected that increases the opacity of the fabric 130 by no more than about 35%, such as no more than about 30%, such as no more than about 25%, such as no more than about 20%, such as no more than about 15%, such as no more than about 13%, such as no more than about 10%, such as no more than about 8%. The opacity of materials can be measured using an XRITE Densitometer Opacity Tester manufactured by X-Rite, Inc. of Grandville, Mich. The above instrument measures density which can be converted to opacity (%). The above instrument measures a density from 0 to 5 with 0 representing 0% opacity and 5 representing approximately 100% opacity. In the above embodiments, the density (opacity) of the fabric 130 prior to being combined with the backing material 132 can be from about 0.2 to about 2, such as from about 0.3 to about 1.8, such as from about 0.5 to about 1.5.

In an alternative embodiment, a backing material can be selected that substantially blocks all light from transmitting through the laminate after the backing material is attached to the fabric 130. For example, the backing material 132 and the fabric 130 can form a laminate having a density (opacity) of greater than about 4, such as greater than about 4.5, such as greater than about 4.8. When selecting a backing material for blocking out light, the backing material may have a relatively high basis weight. For instance, the basis weight of the backing material may be greater than about 20 gsm, such as greater than about 30 gsm, such as greater than about 40 gsm, such as greater than about 50 gsm, such as greater than about 60 gsm. The basis weight of the backing material is generally less than about 150 gsm.

In addition to influencing stiffness, it was also discovered that the backing material of the present disclosure can also have a significant and unexpected impact on the elongation properties of the fabric 130. Of particular advantage, the backing material of the present disclosure can have a significant impact on the stiffness ratio of the fabric and the elongation properties of the fabric while only marginally impacting opacity. As described above, the opacity of the fabric may increase by no more than about 35%, such as no more than about 15%, such as even no more than about 10%. For example, in the direction that stiffness increases, the backing material when applied to the fabric can decrease the elongation of the fabric by greater than about 20%, such as greater than about 25%, such as greater than about 30%, such as even greater than about 35%. The elongation is generally decreased in an amount up to about 100%, such as up to about 80%. Decreasing the elongation of the fabric in the direction that stiffness increases as described above can dramatically and unexpectedly improve the handling and drape characteristics of the resulting material and significantly improve the manufacturing versatility and durability of the composite material. The above changes can be made to elongation using the backing material while again only marginally affecting opacity.

Figure 7:
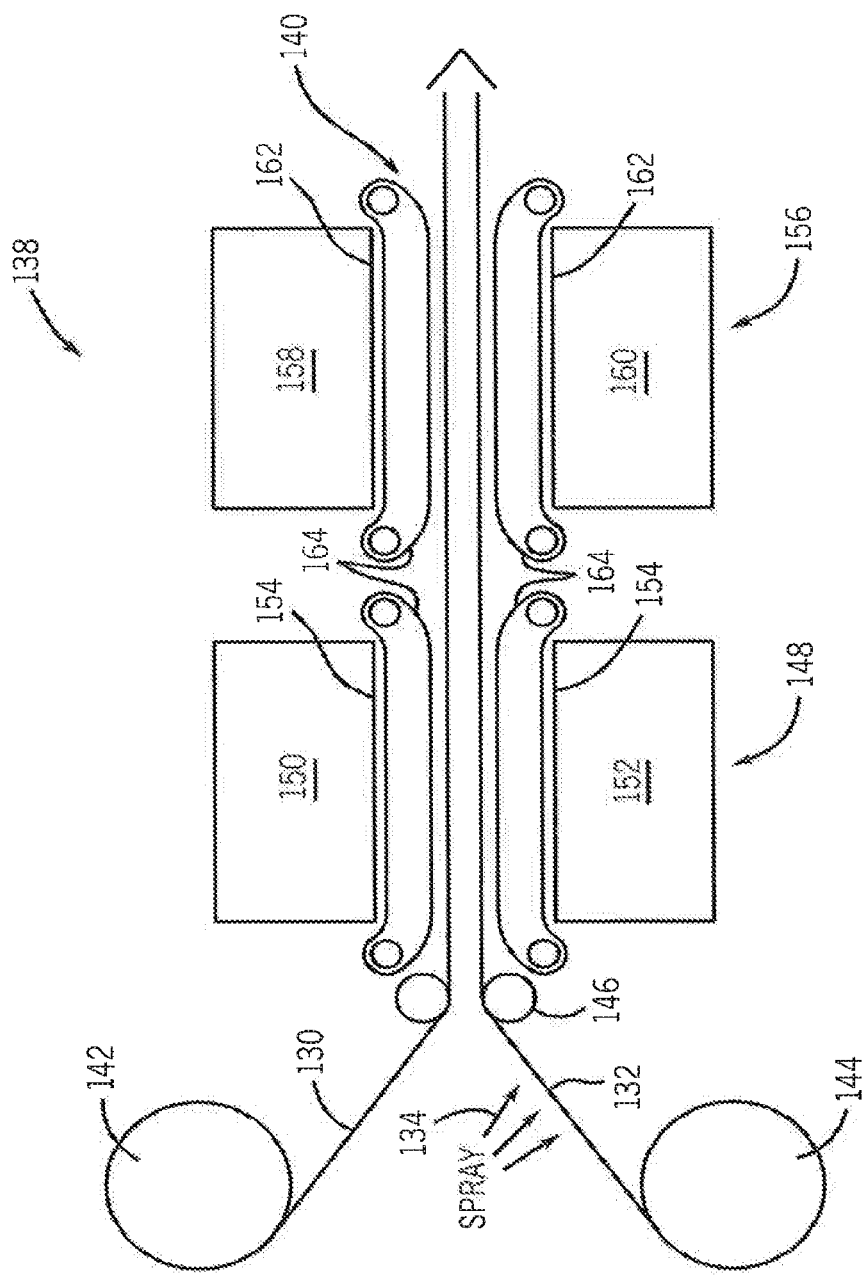
FIG. 7 is a schematic view of a method of manufacturing a vane in accordance with an embodiment of the present disclosure.

FIG. 7 is a schematic view of an illustrative embodiment of a method of manufacturing the vane 110 in accordance with principles of the present disclosure. As shown in FIG. 7, the fabric 130 and the backing material 132 are bonded together in a flatbed laminator 138 to create a laminated fabric assembly 140, which is alternatively referred to as a "fabric laminate" and is subsequently formed into the vane 110. Although FIG. 7 illustrates a flatbed laminator 138, other machines can be used to create the laminated fabric assembly 140 to similar effect, such as calenders and drum machines. In the illustrative embodiment of FIG. 7, the fabric 130 is wound on a first spool 142 and the backing material 132 is wound on a second spool 144. The first spool 142 and the second spool 144 reside and rotate within a common plane in a spaced relationship such that the fabric 130 and the backing material 132 extend from the respective spools 142, 144 in substantial or coextensive alignment. An alignment mechanism 146 for verifying the alignment of the fabric 130 and the backing material 132 is also shown in FIG. 7. In some embodiments, the alignment mechanism 146 fine-tunes the alignment of the fabric 130 and the backing material 132 before the two fabrics 130, 132 are permanently bonded together. Before entering the flatbed laminator 138, the adhesive 134 is applied to one side of at least one of the backing material 132 and the fabric 130. For example, the adhesive 134 may be melt blown or otherwise applied onto the backing material 132 as the backing material 132 is unrolled from the second spool 144. In some embodiments, the backing material 132 is wound onto the second spool 144 with the adhesive 134 pre-applied to the backing material 132 for later activation. Additionally or alternatively, the adhesive 134 may take the form of a web adhesive wound on a third spool, which may reside and rotate within the common plane of, and in a spaced relationship with, the first spool 142 and the second spool 144. In such embodiments, the fabric 130, the backing material 132, and the web adhesive may extend from the respective spools 142, 144 in substantial or coextensive alignment, with the web adhesive positioned between the fabric 130 and the backing material 132.

With continued reference to FIG. 7, the backing material 132 is laminated to one side of the fabric 130 using heat and/or pressure applied by the flatbed laminator 138. For instance, the flatbed laminator 138 may include a heating platen assembly 148 to heat set the adhesive 134 applied between the fabric 130 and the backing material 132. As shown in FIG. 7, the heating platen assembly 148 includes an upper platen 150 and a lower platen 152 maintained at a high temperature between about 300° F. and about 350° F. (e.g., about 325° F.) such that as the fabric 130 and the backing material 132 are passed therebetween, the adhesive 134 is activated to bond the two fabrics 130, 132 together. Each of the upper platen 150 and the lower platen 152 includes a pressure surface 154 that is generally rectangular in shape and is longer than it is wide. In some embodiments, the upper platen 150 and the lower platen 152 press the fabrics 130, 132 together to consistently bond the backing material 132 to the fabric 130. For instance, each of the upper platen 150 and the lower platen 152 may apply a pressure of between about 2.5 psi and about 25 psi (e.g., approximately 5 psi) to the fabric assembly 140. The heat and pressure settings described above are for illustration purposes. In the illustrative embodiment of FIG. 7, the stiffness of the fabric assembly 140 may be tailored by adjusting the heat and/or pressure settings of the heating platen assembly 148.

After passing through the heating platen assembly 148, the fabric assembly 140 may pass through a cooling platen assembly 156 to reduce the temperature of the fabric assembly 140 for later processing (e.g., to room temperature). Similar to the heating platen assembly 148, the cooling platen assembly 156 includes an upper chilling platen 158 and a lower chilling platen 160, each of which applying a pressure to the fabric assembly 140 passing therebetween (e.g., approximately 5 psi) and including a pressure surface 162 that is generally rectangular in shape and is longer than it is wide. Each of the upper chilling platen 158 and the lower chilling platen 160 are water cooled to maintain the reduced temperature of the cooling platen assembly 156. For example, cooling water passes through the upper chilling platen 158 and the lower chilling platen 160 at a temperature between about 52° F. and about 58° F. (e.g., about 54° F.). In the exemplary embodiment of FIG. 7, the fabric 130 and the backing material 132 are continuously passed through the heating platen assembly 148 and/or the cooling platen assembly 156 by one or more conveyors 164 running between about 15 and about 20 feet per minute (e.g., about 18.5 fpm). After passing through the flatbed laminator 138, the fabric assembly 140 may undergo further processing, such as but not limited to, cutting the fabric assembly 140 to desired length for particular applications or products.

Although FIGS. 1-7 illustrate the backing material 132 associated with an operable vane 110 selectively attached to a support sheet 108, the backing material 132 of the present disclosure can be utilized on different vane structures where bending along one axis while having stiffness along the axis is desired. For example, the backing material 132 may be applied to vertical vane structures, roller shades, and/or vane structures attached to and extending between two vertically or horizontally extending sheets of material to create either a vane or shade structure that has a consistent, preferably smooth, appearance throughout due at least in part to increased stiffness in a desired direction (e.g., in a machine direction and/or in a cross direction of the vane or shade structure).

The foregoing description has broad application. It should be appreciated that the concepts disclosed herein may apply to many types of shades, in addition to the shades described and depicted herein. For example, the concepts may apply equally to Roman-type shades, honeycomb shades, vertical shades, or any other shade having an elongated vane that needs to bend along its width or height. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The present disclosure may be better understood with respect to the following further examples.

EXAMPLES

Example 1

Physical properties of backed and unbacked fabric samples were tested. Face fabrics from three different rolls were tested. Each roll was made from a 175 gsm, 100% polyester jacquard weave fabric. Backing fabrics used were a MILIFE oriented nonwoven having a basis weight of 10 gsm and a MILIFE oriented nonwoven having a basis weight of 15 gsm.

Machine-direction and cross-direction stiffness were tested using a Handle-O-Meter, available from Thwing-Albert Instrument Co. of Philadelphia, Pa. Five machine-machine direction and five cross-direction tests were performed using samples from each roll. The average stiffness of the five machine-direction samples and five cross-direction samples tested for each roll is reported in Table 4. The tests were run according to ASTM D2923.

Machine-direction and cross-direction elongation were measured using an Instron 5969 Tensile Tester. Five machine-machine direction and five cross-direction tests were performed using samples from each roll. The sample test size was 2.0"×5.0", the crosshead speed was 1.5 in/min, the force exerted on the specimen was 5 lbf, and the grip distance was 3.0". The average elongations of the five machine-direction samples and five cross-direction samples tested for each roll are reported in Table 4.

ville, Mich., was used to measure visible light transmittance/opacity. This machine measured over a range of about 400-750 nm, and may be considered to provide a more accurate measurement of human visible light transmittance than measurements taken at a single visible light wavelength.

TABLE 5

| | Roll 1 (beige) | | | Roll 2 (dark brown) | | |
|---|---|---|---|---|---|---|
| | Face Fabric Alone | Face Fabric + Backing Fabric | % Change | Face Fabric Alone | Face Fabric + Backing Fabric | % Change |
| Opacity (optical density) | 0.59 | 0.63 | 7 | 1.18 | 1.33 | 13 |

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

TABLE 4

| | Roll 1 | | | Roll 2 | | | Roll 3 | | |
|---|---|---|---|---|---|---|---|---|---|
| | Face Fabric Alone | Face Fabric + Backing Fabric 10 gsm | % Change | Face Fabric Alone | Face Fabric + Backing Fabric 10 gsm | % Change | Face Fabric Alone | Face Fabric + Backing Fabric 15 gsm | % Change |
| MD/Warp Direction Stiffness (gram-force) | 10 | 74.7 | 647 | 9.1 | 75.2 | 726 | 10.5 | 87.9 | 737 |
| CD/Weft Direction Stiffness (gram-force) | 32.8 | 35.2 | 7 | 35.1 | 39.1 | 11 | 40.9 | 50.2 | 23 |
| MD Elongation (% stretch) | 76 | 47.4 | −38 | 80.4 | 48.8 | −39 | 68.6 | 34.9 | −49 |
| CD Elongation (% stretch) | 49.3 | 41.7 | −15 | — | — | — | 31.4 | 37.5 | 19 |
| Thickness (in) | 0.0123 | 0.0141 | 15 | 0.0129 | 0.0146 | 13 | 0.0123 | 0.0141 | 15 |

Example 2

The effect of the backing fabric on opacity was tested. Face fabrics from Example 1 were tested for opacity alone and with a MILIFE 10 gsm oriented nonwoven backing fabric. Face fabric from roll 1 had a beige color and face fabric from roll 2 had a dark brown color. Five tests were run for each sample. The average optical density of the five samples is shown in Table 5. The tests were run using an Xrite Densitometer Opacity Tester having a 3 mm aperture. The X-Rite Densitometer, made by X-Rite, Inc. of Grand- The phrases "at least one", "one or more", and "and/or", as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed:

1. A fabric laminate for an architectural coveting, the fabric laminate comprising:
   a fabric material portion having a first stiffness in a first direction, and a second stiffness in a second direction transverse to said first direction; and
   a backing material portion bonded to said fabric material portion, wherein said backing material portion increases said first stiffness, said backing material portion increasing said second stiffness less than said first stiffness so as to increase a stiffness ratio between said first stiffness and said second stiffness;
   wherein:
   said backing material portion comprises a nonwoven web formed from a plurality of entangled fibers or filaments;
   said plurality of entangled fibers or filaments are oriented substantially along said first direction;
   said backing material has a basis weight of less than 20 grams per square meter (gsm); and
   said backing material portion and said fabric material portion form discrete layers of the fabric laminate.

2. A fabric laminate according to claim 1, wherein:
   said first direction extends along a machine direction of said fabric material portion; and
   said second direction extends along a cross direction of said fabric material portion.

3. A fabric laminate according to claim 1, wherein:
   said fabric material portion has a first stiffness ratio biased in one of said first direction and said second direction; and
   said backing material portion causes said fabric laminate to have a second stiffness ratio biased in the other of said first direction and said second direction.

4. A fabric laminate according to claim 1, wherein said stiffness ratio is greater than approximately 1.5:1.

5. A fabric laminate according to claim 1, wherein said backing material portion increases the first stiffness in the first direction at least about 1.5 times greater than an effect on said second stiffness in said second direction.

6. A fabric laminate according to claim 1, wherein said nonwoven web comprises a spunbond web, a meltblown web, a carded web, a hydroentangled web, an airlaid web, a wetlaid web, or a coform web.

7. A fabric laminate as defined in claim 1, wherein said backing material portion increases said first stiffness at least 3 times, while increasing the second stiffness less than 2 times.

8. A fabric laminate as defined in claim 1, wherein said fabric material portion has an elongation in said first direction and wherein said backing material portion bonded to said fabric material portion decreases said elongation in said first direction at least about 20%.

9. A fabric laminate according to claim 1, wherein the backing material portion bonded to said fabric material portion increases an opacity of said fabric material portion by less than about 30%.

10. A fabric laminate according to claim 9, wherein said fabric material portion has an optical density (opacity) of from about 0.2 to about 2.

11. A vane laminate for an architectural covering, the vane laminate having a machine direction stiffness along a length of said vane laminate and a cross direction stiffness along a height of said vane laminate, the vane laminate comprising:
    a woven vane fabric; and
    a backing material connected to said woven vane fabric, said backing material comprising a nonwoven web comprising a plurality of entangled fibers and/or filaments;
    wherein:
    said backing material increases said machine direction stiffness of said vane laminate while slightly affecting said cross direction stiffness of said vane laminate such that the machine direction stiffness increases at least about 1.5 times greater than the effect on said cross-direction stiffness;
    said plurality of entangled fibers and/or filaments are oriented substantially along a machine direction extending along the length of said vane laminate;
    said backing material has a basis weight of less than 20 grams per square meter (gsm); and
    said backing material is adhesively bonded to said woven vane fabric.

12. A vane laminate according to claim 11, wherein:
    said woven vane fabric has a first stiffness ratio;
    said vane laminate has a second stiffness ratio; and
    said first stiffness ratio of said woven vane fabric is less than approximately 1:1; and
    said second stiffness ratio of said vane laminate is greater than approximately 1.5:1.

13. A vane laminate according to claim 12, wherein said machine direction stiffness increases by at least about 3 times or more while said cross direction stiffness increases by less than about 1 times.

14. A vane laminate according to claim 12, wherein a stiffness ratio between said machine direction stiffness and said cross direction stiffness of said vane laminate is greater than about 1.5:1.

15. A vane laminate according to claim 14, wherein said stiffness ratio is less than or equal to about 18:1.

16. A vane laminate according to claim 11, wherein said nonwoven web comprises a spunbond web, a meltblown web, carded web, hydroentangled web, airlaid web, wetlaid web, or conform web, said vane fabric having an optical density (opacity) of from about 0.2 to about 2 and wherein said backing material has a basis weight of less than 17 gsm.

17. A covering for an architectural opening, the covering comprising:
    a support sheet;
    at least one vane having a first edge and a second edge opposite said first edge, said first edge connected to said support sheet, and said second edge movable relative to said support sheet, wherein said at least one vane comprises the vane laminate according to claim 11.

18. The covering according to claim 17, further comprising:
    a head rail; and
    a bottom rail;

wherein:
said support sheet extends between said head rail and said bottom rail; and
said at least one vane extends substantially parallel to said head rail and said bottom rail.

19. A fabric laminate according to claim 1, wherein said fabric material comprises a woven fabric material.

20. A fabric laminate according to claim 1, wherein said backing material portion is adhesively bonded to said fabric material portion.

21. A vane laminate according to claim 11, wherein said backing material and said woven vane fabric form discrete layers of the vane laminate.

22. A fabric laminate according to claim 1, wherein said backing material has a basis weight of less than 17 gsm.

23. A fabric laminate according to claim 22, wherein said backing material has a basis weight of less than 13 gsm.

24. A fabric laminate according to claim 1, wherein said nonwoven web comprises a unidirectionally oriented web hydroentangled with one or more additional webs.

25. A fabric laminate according to claim 24, wherein the one or more additional webs comprises one or more carded webs.

26. A vane laminate according to claim 11, wherein said nonwoven web comprises a unidirectionally oriented web hydroentangled with one or more additional webs.

27. A vane laminate according to claim 25, wherein the one or more additional webs comprises one or more carded webs.

* * * * *